(12) United States Patent
Homan

(10) Patent No.: US 10,989,514 B2
(45) Date of Patent: Apr. 27, 2021

(54) ELASTOMERIC SLEEVE FOR TAPE MEASURE

(71) Applicant: David A. Homan, Candler, NC (US)

(72) Inventor: David A. Homan, Candler, NC (US)

(*) Notice: Subject to any disclaimer, the term of this patent is extended or adjusted under 35 U.S.C. 154(b) by 189 days.

(21) Appl. No.: 16/508,485

(22) Filed: Jul. 11, 2019

(65) Prior Publication Data

US 2020/0355484 A1 Nov. 12, 2020

Related U.S. Application Data

(60) Provisional application No. 62/845,624, filed on May 9, 2019.

(51) Int. Cl.
*G01B 3/1041* (2020.01)

(52) U.S. Cl.
CPC .................. *G01B 3/1041* (2013.01)

(58) Field of Classification Search
CPC .............................. G01B 3/1041; G01B 3/1048
USPC .................................................... 33/768, 760
See application file for complete search history.

(56) References Cited

U.S. PATENT DOCUMENTS

| | | | | |
|---|---|---|---|---|
| 5,025,966 A | * | 6/1991 | Potter | A45F 5/02 224/183 |
| 5,100,037 A | * | 3/1992 | Kopyta | A45F 5/02 224/235 |
| D334,286 S | * | 3/1993 | Keene | 224/904 |
| 5,257,729 A | * | 11/1993 | Silvernail | A45F 5/00 224/219 |
| 5,845,413 A | * | 12/1998 | Zayat, Jr. | G01B 3/1084 33/760 |
| D437,999 S | * | 2/2001 | Williamson | D3/228 |
| 6,182,916 B1 | * | 2/2001 | Lin | G01B 3/1005 242/376 |
| D447,712 S | * | 9/2001 | Hsu | D10/72 |
| 6,457,252 B1 | * | 10/2002 | Kershner | G01B 3/1071 33/755 |
| D476,244 S | * | 6/2003 | Lee | D10/72 |
| 7,726,039 B2 | * | 6/2010 | Lee | G01B 3/1041 33/769 |
| D711,753 S | * | 8/2014 | Moreau | D10/74 |
| 9,170,082 B2 | * | 10/2015 | Moreau | G01B 3/1041 |
| 9,248,565 B1 | * | 2/2016 | Latham | B25H 3/006 |
| D758,220 S | * | 6/2016 | Votel | D10/74 |
| 9,504,310 B2 | * | 11/2016 | Foreman | A45F 5/021 |

(Continued)

*Primary Examiner* — Yaritza Guadalupe-McCall
(74) *Attorney, Agent, or Firm* — William G. Heedy; The Van Winkle Law Firm

(57) ABSTRACT

A sleeve for use in combination with a tape measure includes an elastomeric main body surrounding a cavity, the main body being sized and configured for snug fit engagement of the tape measure; a plurality of openings formed on the main body; a first one of the plurality of openings surrounding a tape opening of the tape measure, such that the tape may be selectively passed therethrough; a second one of the plurality of openings for surrounding a tape measure control of the tape measure, such that the tape measure control may be selectively actuated therethrough; a third one of the plurality of openings for surrounding a clip of the tape measure, such that the clip may be selectively operated therethrough; a metallic plate being structured and disposed for magnetically securing a magnet element of a writing instrument; and a pocket for receipt of the writing instrument.

15 Claims, 4 Drawing Sheets

(56) References Cited

U.S. PATENT DOCUMENTS

| | | | |
|---|---|---|---|
| D912,402 S * | 3/2021 | Rodriguez, Jr. | D3/303 |
| 2002/0011006 A1 * | 1/2002 | Smith | G01B 3/1084 33/668 |
| 2003/0233762 A1 * | 12/2003 | Blackman | G01B 3/1041 33/769 |
| 2005/0210697 A1 * | 9/2005 | Lee | G01B 3/1041 33/767 |
| 2005/0262717 A1 * | 12/2005 | Chen | G01B 3/1041 33/761 |
| 2005/0268480 A1 * | 12/2005 | Potter | G01B 3/1056 33/768 |
| 2009/0044419 A1 * | 2/2009 | Lee | G01B 3/1041 33/769 |
| 2009/0064526 A1 * | 3/2009 | Farnworth | G01B 3/1056 33/767 |
| 2011/0138644 A1 * | 6/2011 | Smith | G01B 3/1005 33/767 |
| 2013/0025147 A1 * | 1/2013 | Steele | G01B 3/1041 33/769 |
| 2014/0165414 A1 * | 6/2014 | Smith | G01B 3/1084 33/768 |
| 2020/0355484 A1 * | 11/2020 | Homan | G01B 3/1048 |

* cited by examiner

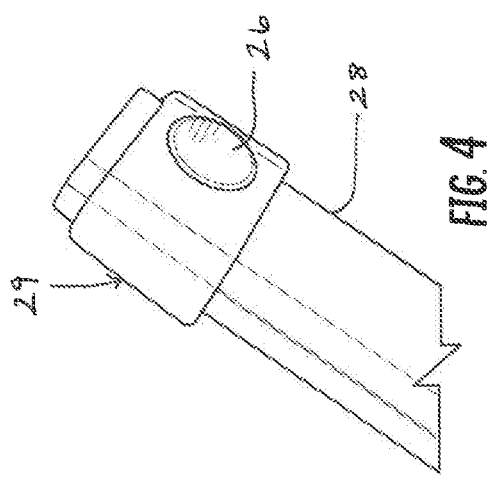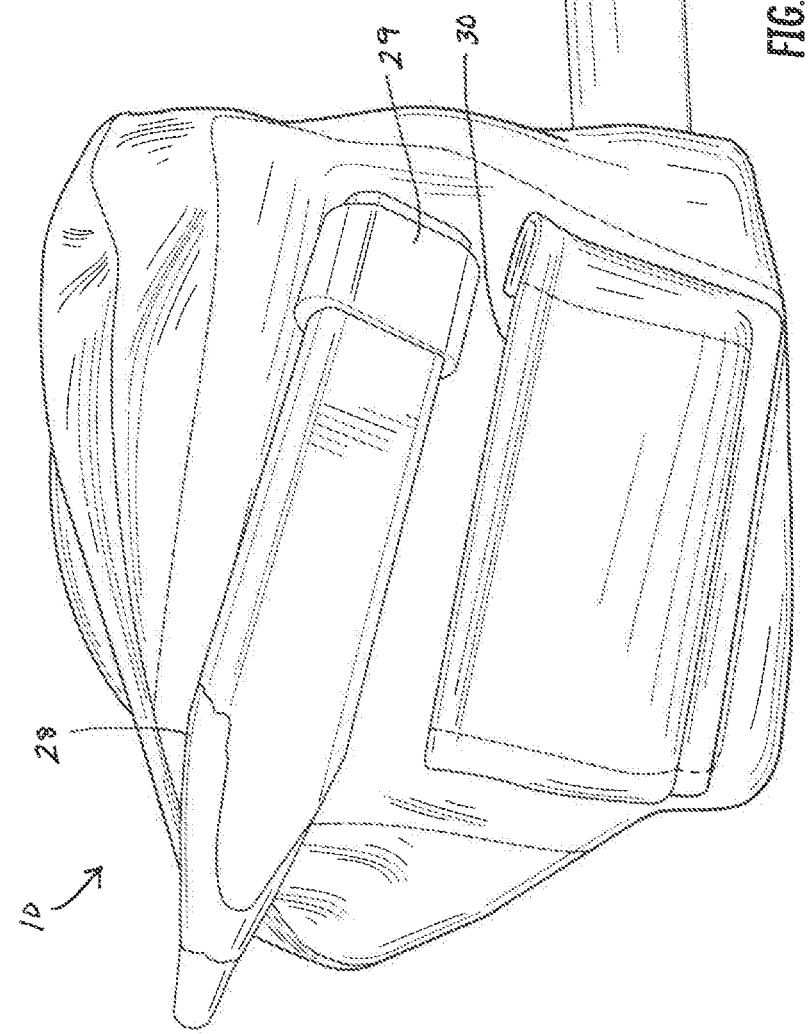

ELASTOMERIC SLEEVE FOR TAPE MEASURE

RELATED APPLICATION

This application claims priority to and incorporates entirely by reference U.S. Provisional Application No. 62/845,624 filed on May 9, 2019.

FIELD OF THE INVENTION

This invention relates to tape measures and, more particularly, a sleeve that is sized and configured for interchangeable receipt of a tape measure.

BACKGROUND OF THE INVENTION

A tape measure, also known as a measuring tape, is a flexible ruler that may be coiled for storage and uncoiled when used to measure distance. A basic type of tape measure is the spring return pocket tape measure. Spring return pocket tape measures will generally fit in a pocket. The tape is returned to the case by a spring mechanism. Most pocket tape measures have a tape one foot to fifteen feet in length and ¼ to ¾ inches across.

When working with a tape measure, it is often necessary to make a marking for indicating a measurement. While there presently exists certain related improvements relating to this purpose, such as the tape measure marking attachment disclosed in U.S. Pat. No. 5,477,619, these improvements have not been adequate as they are not configurable to operate in combination with different-sized tape measures.

Therefore, with the above reasons taken into consideration, there exists a need for a sleeve that is sized and configured for interchangeable receipt of a tape measure.

SUMMARY OF THE INVENTION

In accordance with one form of the present invention, there is provided a sleeve for use in combination with a tape measure, the sleeve including an elastomeric main body surrounding a cavity, the main body being sized and configured for snug fit engagement of the tape measure within the cavity formed by the main body; a plurality of openings formed on the main body, each of the plurality of openings extending through a width of the main body; a first one of the plurality of openings being sized and configured for surrounding a tape opening of the tape measure, such that the tape may be selectively extended and retracted through the first one of the plurality of openings; a second one of the plurality of openings being sized and configured for surrounding a tape measure control of the tape measure, such that the tape measure control may be selectively actuated through the second one of the plurality of openings; a third one of the plurality of openings being sized and configured for surrounding a clip of the tape measure, such that the clip may be selectively operated through the third one of the plurality of openings; a metallic plate sized for receipt in a compartment on an inner facing surface of a side of the main body opposite the third one of the plurality of openings, the metallic plate being structured and disposed for magnetically securing a magnet element of a writing instrument on an outer facing surface of the main body; a pocket formed on the main body, the pocket being sized and configured for receipt of the writing instrument; and wherein the tape measure may be selectively removed from and inserted into the cavity of the main body through the third one of the plurality of openings.

In accordance with another form of the present invention, there is provided a sleeve for use in combination with a tape measure, the sleeve including an elastomeric main body surrounding a cavity, the main body being sized and configured for snug fit engagement of the tape measure within the cavity formed by the main body; a plurality of openings formed on the main body, each of the plurality of openings extending through a width of the main body; a first one of the plurality of openings being sized and configured for surrounding a tape opening of the tape measure, such that the tape may be selectively extended and retracted through the first one of the plurality of openings; a second one of the plurality of openings being sized and configured for surrounding a tape measure control of the tape measure, such that the tape measure control may be selectively actuated through the second one of the plurality of openings; a third one of the plurality of openings being sized and configured for surrounding a clip of the tape measure, such that the clip may be selectively operated through the third one of the plurality of openings; a metallic plate sized for receipt in a compartment on an inner facing surface of a side of the main body opposite the third one of the plurality of openings, the metallic plate being structured and disposed for magnetically securing a magnet element of a writing instrument on an outer facing surface of the main body; and wherein the tape measure may be selectively removed from and inserted into the cavity of the main body through the third one of the plurality of openings.

In accordance with another form of the present invention, there is provided a sleeve for use in combination with a tape measure, the sleeve including an elastomeric main body surrounding a cavity, the main body being sized and configured for snug fit engagement of the tape measure within the cavity formed by the main body; a first opening formed on the main body and being sized and configured for surrounding a tape opening of the tape measure, such that the length of tape may be selectively extended and retracted through the first opening; a second opening formed on the main body and being sized and configured for surrounding a clip of the tape measure, such that the clip may be selectively operated through the second opening; a metallic plate sized for receipt in a compartment on an inner facing surface of a side of the main body opposite the second opening, the metallic plate being structured and disposed for magnetically securing a magnet element of a writing instrument on an outer facing surface of the main body; and wherein the tape measure may be selectively removed from and inserted into the cavity of the main body through the third one of the plurality of openings.

BRIEF DESCRIPTION OF THE DRAWINGS

For a fuller understanding of the nature of the present invention, reference should be made to the following detailed description, taken in conjunction with the accompanying drawings in which:

FIG. 4 is an isolated view of the magnet element of the writing instrument; and

FIG. 5 is a perspective view illustrating the writing instrument secured to the metallic plate by the magnet element.

Like reference numerals refer to like parts throughout the several views of the drawings.

DETAILED DESCRIPTION OF THE PREFERRED EMBODIMENTS

Referring to the several views of the drawings, the elastomeric sleeve of the present invention for use in conjunction with a tape measure 100 is shown and described herein and is generally indicated as 10.

Figure 1:
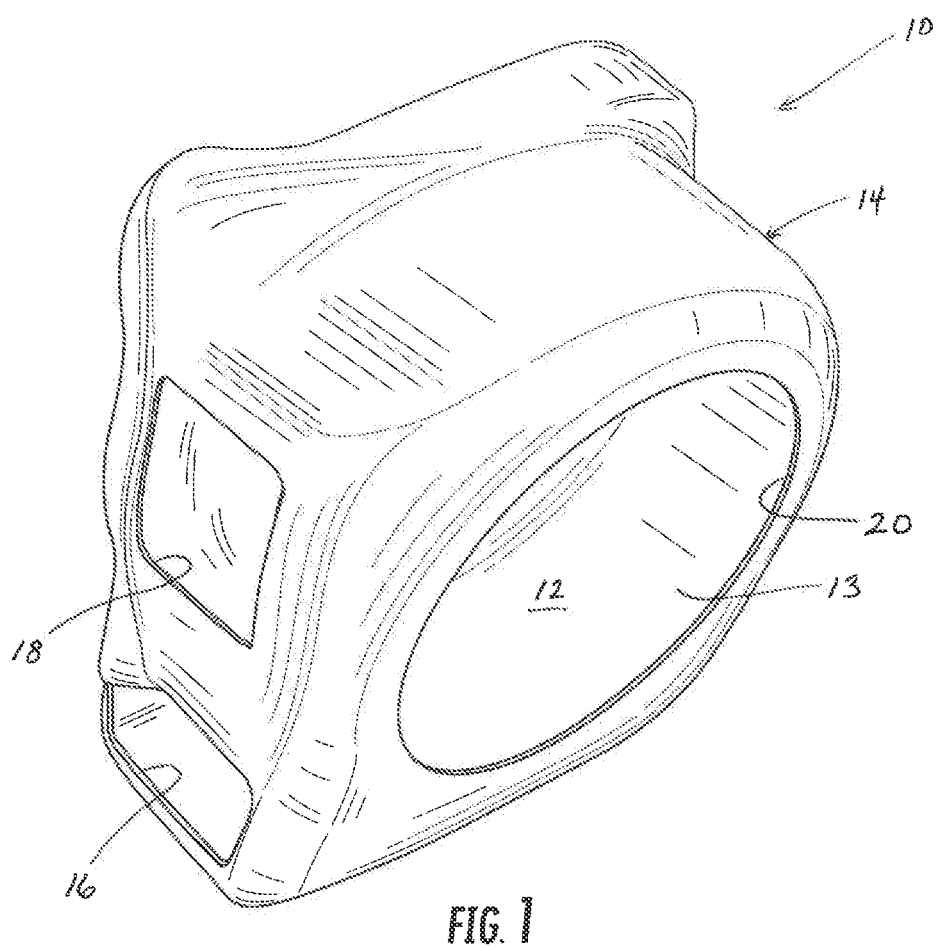
FIG. 1 is a perspective view of the elastomeric sleeve of the present invention.
Figure 2:
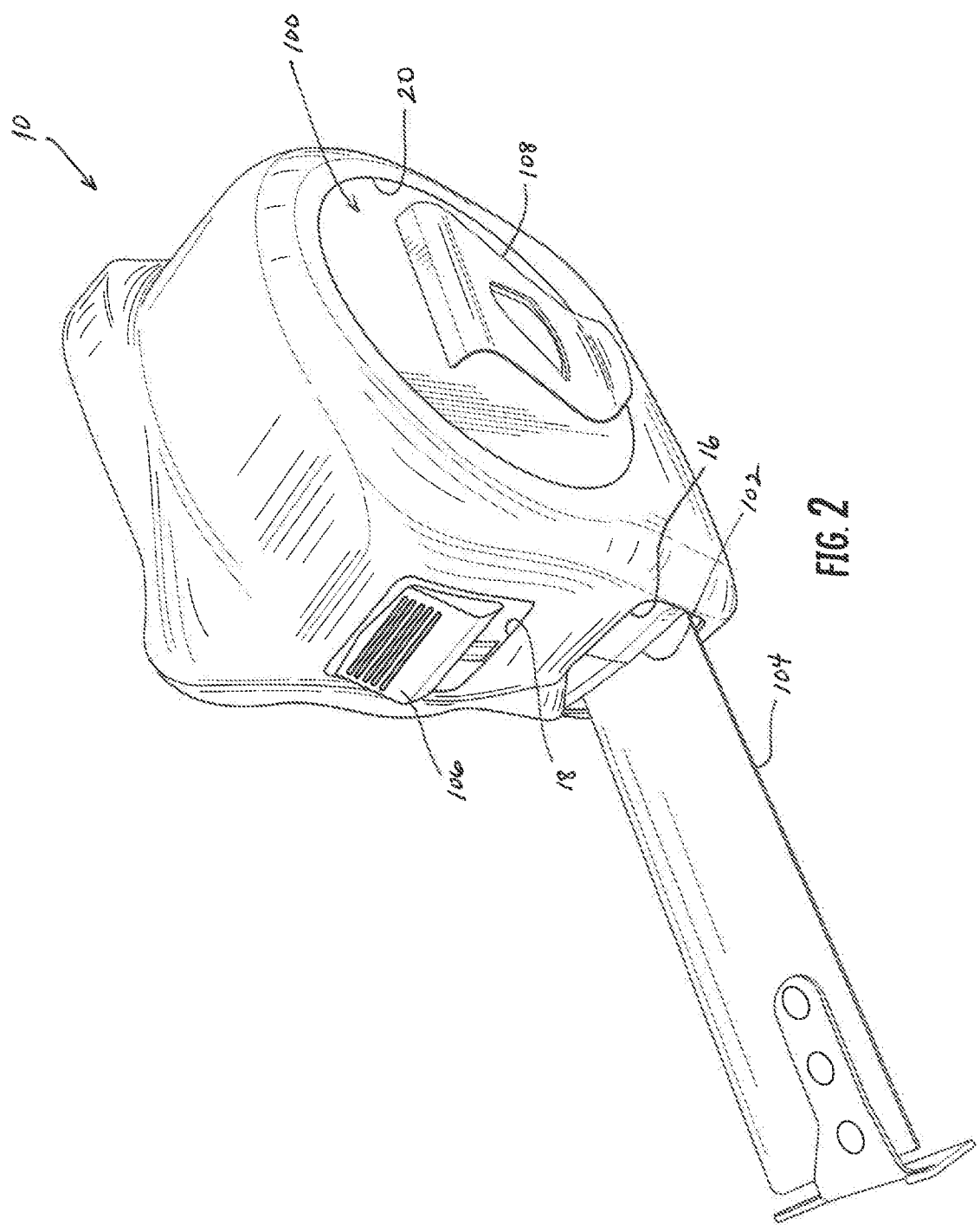
FIG. 2 is a perspective view thereof and including a tape measure.

Referring initially to FIGS. 1 and 2, the elastomeric sleeve 10 includes a cavity 12 surrounded by an inner surface 13 of an elastomeric main body 14. The main body 14 is sized and configured for snug fit engagement of the tape measure 100 within the cavity 12. A plurality of openings is formed on the main body 14, each of the plurality of openings extending through a width of the main body 14.

Still referring to FIGS. 1 and 2, a first one 16 of the plurality of openings is sized and configured for surrounding a tape opening 102 of the tape measure 100, such that the tape 104 may be selectively extended and retracted through the first one 16 of the plurality of openings. A second one 18 of the plurality of openings is sized and configured for surrounding a tape measure control 106 of the tape measure 100, such that the tape measure control 106 may be selectively actuated through the second one 18 of the plurality of openings. A third one 20 of the plurality of openings is sized and configured for surrounding a clip 108 of the tape measure 100, such that the clip 108 may be selectively operated through the third one 20 of the plurality of openings. In one embodiment, there is an added layer of material surrounding one or more of the first, second and third openings 16, 18, and 20 for added reinforcement.

Figure 3:
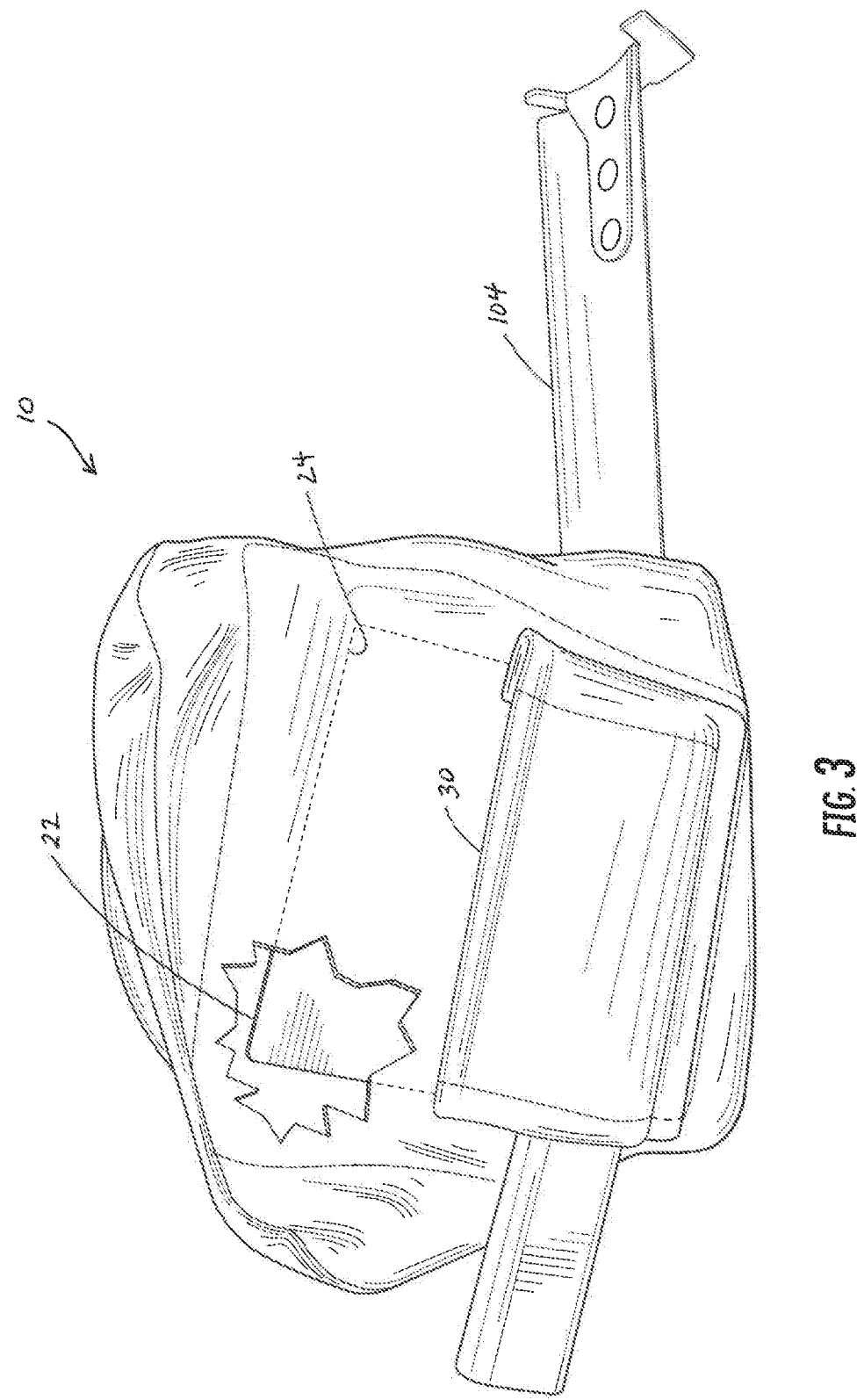
FIG. 3 is a side elevational view shown in partial cross section illustrating a metallic plate and further including a writing instrument stored in a pocket.

Referring now to FIGS. 3-5, a metallic plate 22 sized for receipt in an inner lining 24 on the inner facing surface 13 of a side of the main body 14 opposite the third one 20 of the plurality of openings. The metallic plate 22 is structured and disposed for magnetically securing a magnet element 26 of a writing instrument 28 on an outer facing surface of the main body 14. In one embodiment, the magnet element 26 is on an attachment member 29 sized and configured to be secured to the writing instrument 28. A preferred embodiment of the attachment member 29 is an elastic strap member. In one embodiment, the metallic plate 22 is formed in the inner lining 24 by a metallic mesh material.

On the same side of the main body 14 as the metallic plate 22, a pocket 30 is provided. The pocket 30 is sized and configured for receipt of the writing instrument 28 for instances wherein the writing instrument 28 does not include a magnet element. In one embodiment, the pocket 30 shares a common footprint with the metallic plate 22.

Tape measures 100 may be selectively and interchangeably removed from and inserted into the cavity 12 of the main body 14 through the third one 20 of the plurality of openings, which, in one embodiment, is the largest of the first, second and third ones 16, 18 and 20 of the plurality of openings. The elastomeric material used to form the main body 14 permits the sleeve 10 to be operable in combination with different varieties of tape measures 100.

The materials used to form the main body 14 may be selected from one or more of the following non-limiting materials: plastic, nylon, rayon, polyester, mesh, leather, rubber, cotton, and wool. Moreover, a zipper, hook and loop or snap fastening element may be included on the main body 14 for securing the tape measure 100 within the cavity 12 of the main body 14.

While the present invention has been shown and described in accordance with several preferred and practical embodiments, it is recognized that departures from the instant disclosure are contemplated within the spirit and scope of the present invention.

What is claimed is:

1. A sleeve for use in combination with a tape measure having a length of tape, a tape measure control and a clip, the sleeve comprising:
   an elastomeric main body surrounding a cavity, the main body being sized and configured for snug fit engagement of the tape measure within the cavity formed by the main body;
   a plurality of openings formed on the main body, each of the plurality of openings extending through a width of the main body;
   a first one of the plurality of openings being sized and configured for surrounding a tape opening of the tape measure, such that the tape may be selectively extended and retracted through the first one of the plurality of openings;
   a second one of the plurality of openings being sized and configured for surrounding a tape measure control of the tape measure, such that the tape measure control may be selectively actuated through the second one of the plurality of openings;
   a third one of the plurality of openings being sized and configured for surrounding a clip of the tape measure, such that the clip may be selectively operated through the third one of the plurality of openings;
   a metallic plate sized for receipt in a compartment on an inner facing surface of a side of the main body opposite the third one of the plurality of openings, the metallic plate being structured and disposed for magnetically securing a magnet element of a writing instrument on an outer facing surface of the main body;
   a pocket formed on the main body, the pocket being sized and configured for receipt of the writing instrument; and
   wherein the tape measure may be selectively removed from and inserted into the cavity of the main body through the third one of the plurality of openings.

2. The sleeve as recited in claim 1 further comprising an attachment member housing the magnet element, the attachment member being sized and configured to be secured to the writing instrument.

3. The sleeve as recited in claim 2 wherein the attachment member is an elastic band.

4. The sleeve as recited in claim 1 wherein the metallic plate is formed in the compartment by a metallic mesh material.

5. A sleeve for use in combination with a tape measure having a length of tape, a tape measure control and a clip, the sleeve comprising:
   an elastomeric main body surrounding a cavity, the main body being sized and configured for snug fit engagement of the tape measure within the cavity formed by the main body;
   a plurality of openings formed on the main body, each of the plurality of openings extending through a width of the main body;
   a first one of the plurality of openings being sized and configured for surrounding a tape opening of the tape measure, such that the tape may be selectively extended and retracted through the first one of the plurality of openings;

a second one of the plurality of openings being sized and configured for surrounding a tape measure control of the tape measure, such that the tape measure control may be selectively actuated through the second one of the plurality of openings;

a third one of the plurality of openings being sized and configured for surrounding a clip of the tape measure, such that the clip may be selectively operated through the third one of the plurality of openings;

a metallic plate sized for receipt in a compartment on an inner facing surface of a side of the main body opposite the third one of the plurality of openings, the metallic plate being structured and disposed for magnetically securing a magnet element of a writing instrument on an outer facing surface of the main body; and wherein the tape measure may be selectively removed from and inserted into the cavity of the main body through the third one of the plurality of openings.

6. The sleeve as recited in claim 5 further comprising a pocket formed on the main body, the pocket being sized and configured for receipt of the writing instrument.

7. The sleeve as recited in claim 5 further comprising an attachment member housing the magnet element, the attachment member being sized and configured to be secured to the writing instrument.

8. The sleeve as recited in claim 7 wherein the attachment member is an elastic band.

9. The sleeve as recited in claim 5 wherein the metallic plate is formed in the compartment by a metallic mesh material.

10. A sleeve for use in combination with a tape measure having a length of tape, a tape measure control and a clip, the sleeve comprising:

an elastomeric main body surrounding a cavity, the main body being sized and configured for snug fit engagement of the tape measure within the cavity formed by the main body;

a first opening formed on the main body and being sized and configured for surrounding a tape opening of the tape measure, such that the length of tape may be selectively extended and retracted through the first opening;

a second opening formed on the main body and being sized and configured for surrounding a clip of the tape measure, such that the clip may be selectively operated through the second opening;

a metallic plate sized for receipt in a compartment on an inner facing surface of a side of the main body opposite the second opening, the metallic plate being structured and disposed for magnetically securing a magnet element of a writing instrument on an outer facing surface of the main body; and wherein the tape measure may be selectively removed from and inserted into the cavity of the main body through the second opening.

11. The sleeve as recited in claim 10 further comprising a third opening formed on the main body and being sized and configured for surrounding a tape measure control of the tape measure, such that the tape measure control may be selectively actuated by a user through the third opening.

12. The sleeve as recited in claim 10 further comprising a pocket formed on the main body, the pocket being sized and configured for receipt of the writing instrument.

13. The sleeve as recited in claim 10 further comprising an attachment member housing the magnet element, the attachment member being sized and configured to be secured to the writing instrument.

14. The sleeve as recited in claim 13 wherein the attachment member is an elastic band.

15. The sleeve as recited in claim 10 wherein the metallic plate is formed in the compartment by a metallic mesh material.

\* \* \* \* \*